United States Patent Office 2,748,855
Patented June 5, 1956

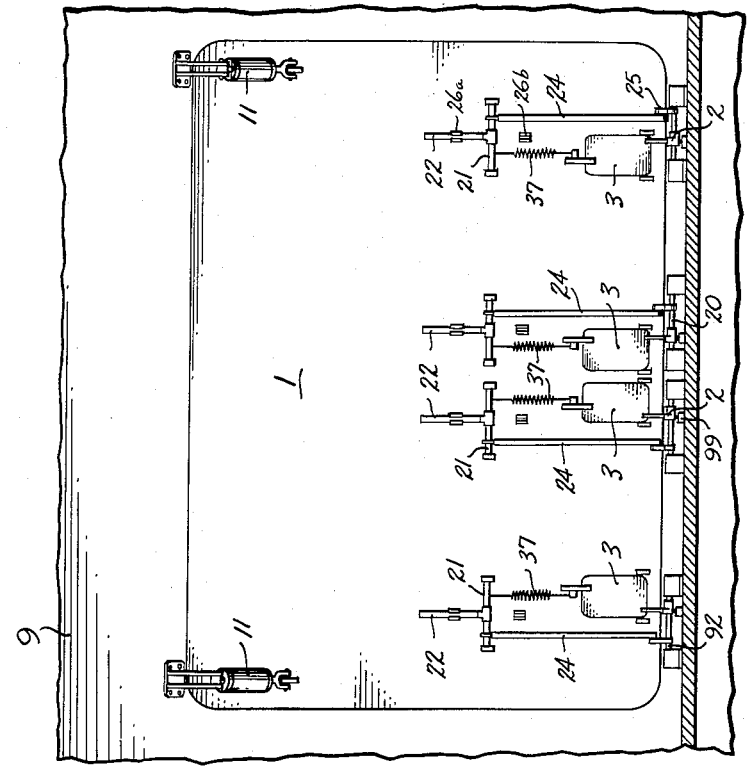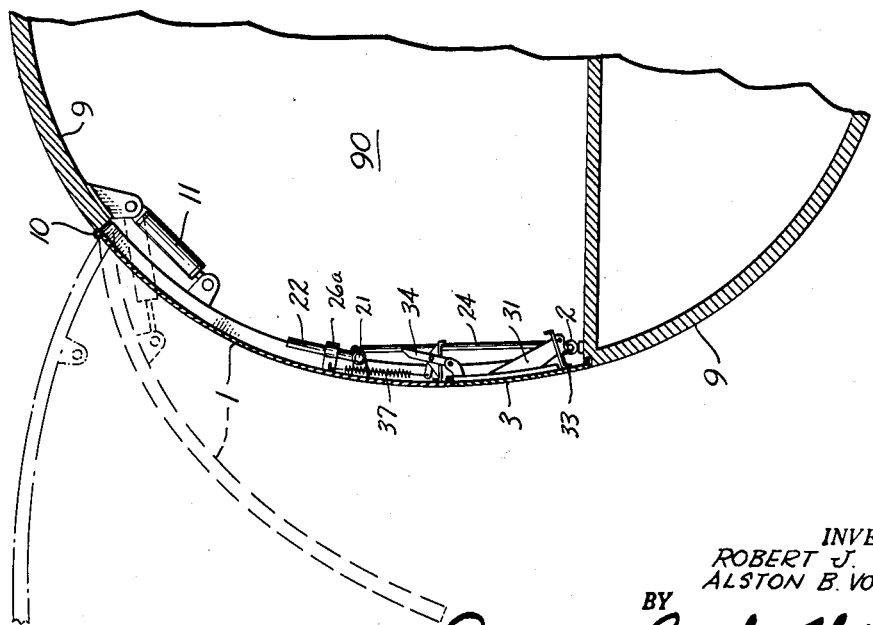

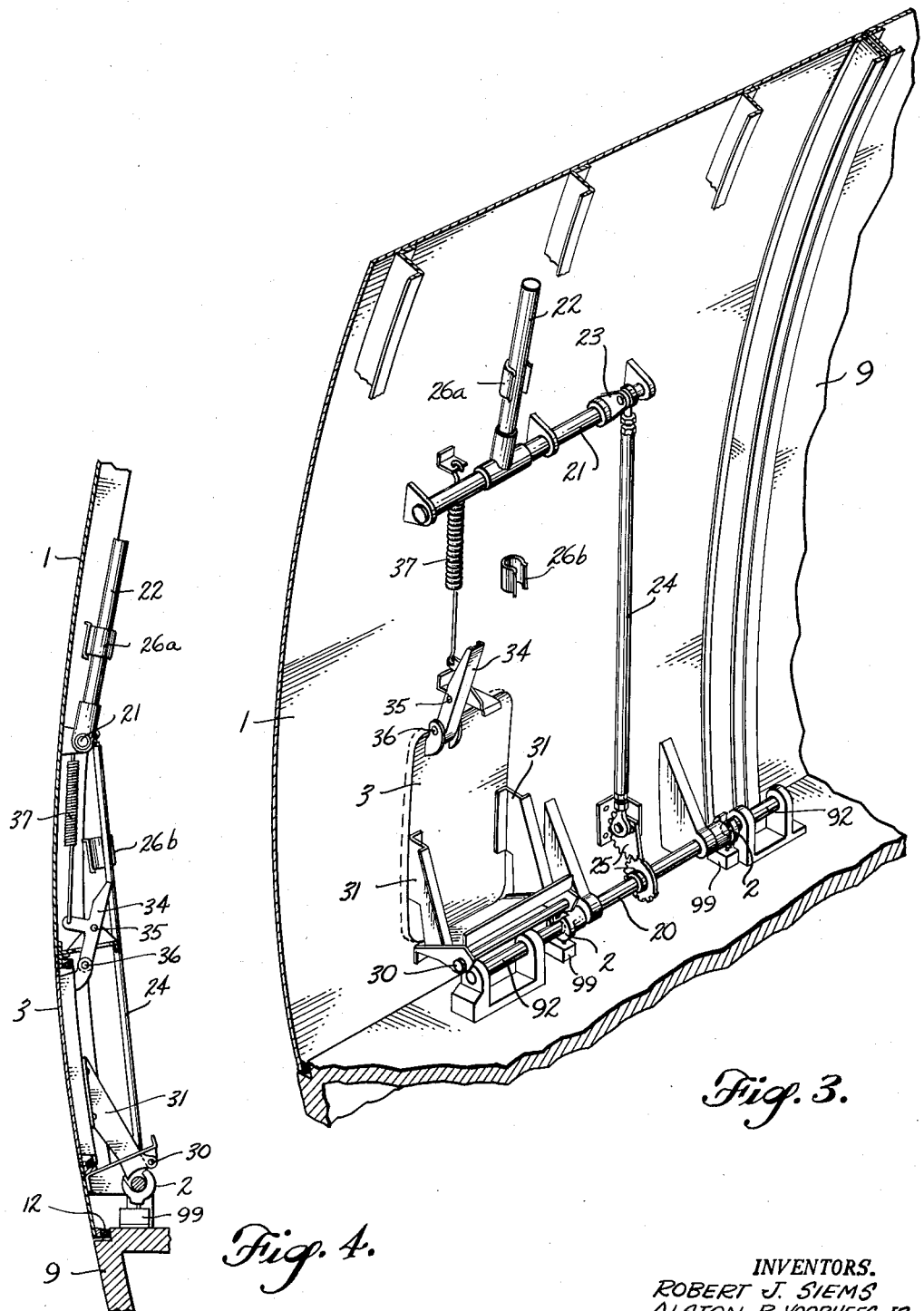

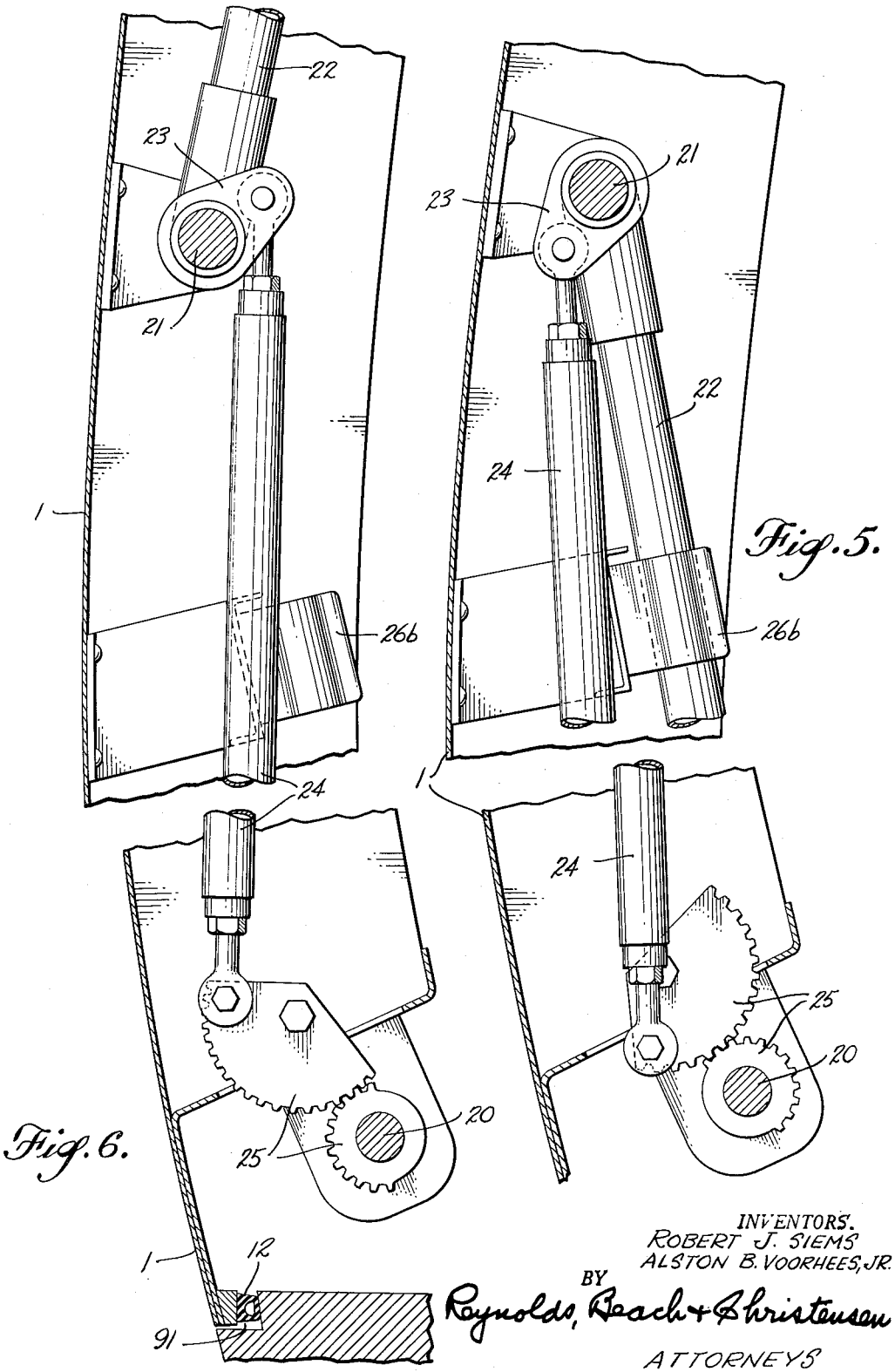

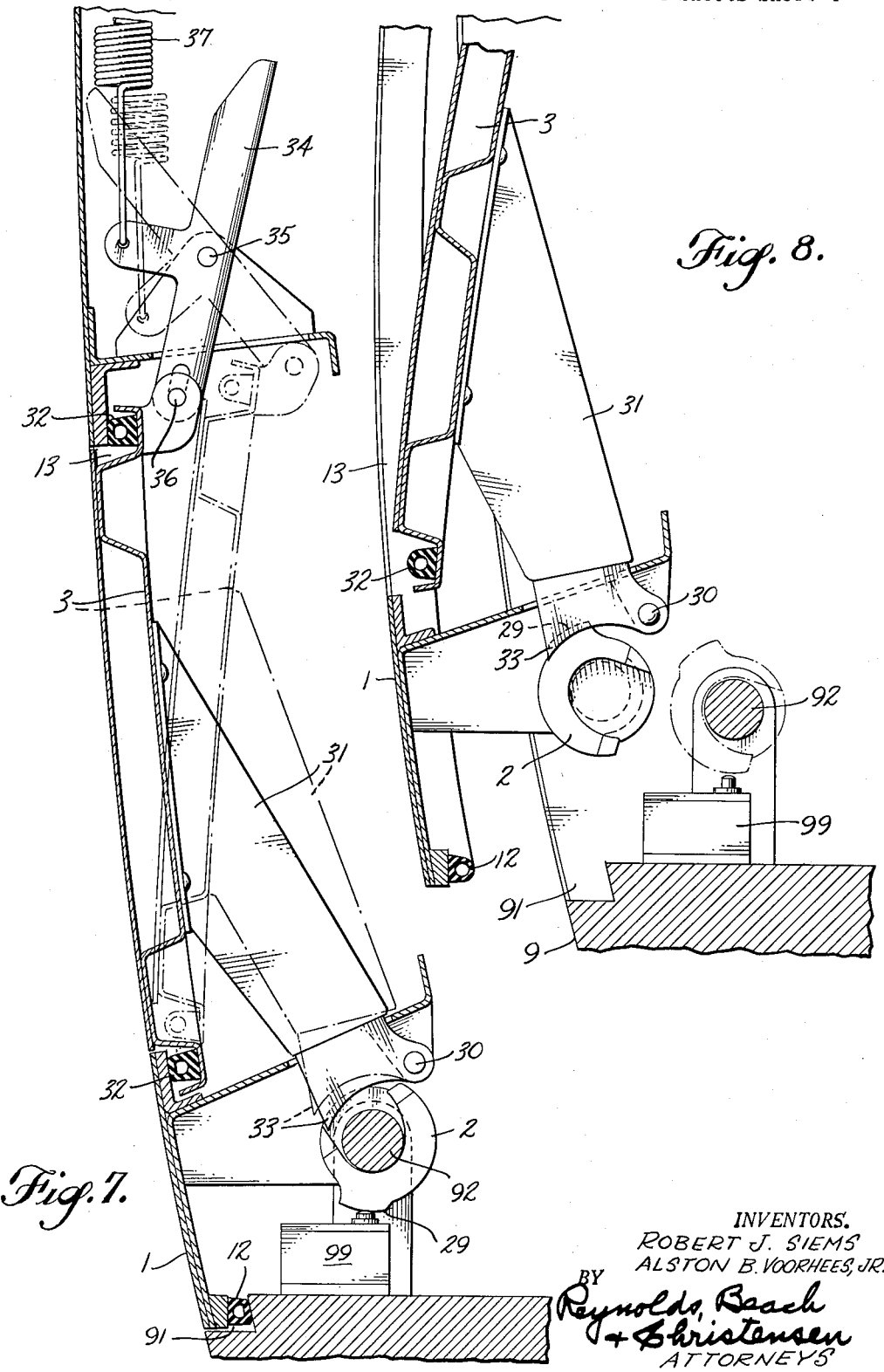

2,748,855

BLOW-OUT SAFE AIRCRAFT DOORS

Robert J. Siems, Seattle, and Alston B. Voorhees, Jr., Bellevue, Wash., assignors to Boeing Airplane Company, Seattle, Wash., a corporation of Delaware Application February 21, 1955, Serial No. 489,712

7 Claims. (Cl. 160—210)

Aircraft cabins are commonly pressurized, thereby imposing a pressure force from within upon doors, escape hatches, and the like, which open outwardly, tending to open them. There have been accidents in which such doors have been blown open while in flight, and passengers have been projected through them by the outrush of pressure from within the cabin. There have been instances where the latches or other securing means for such doors have been accidentally released in flight, with similar results. Where the door is a very large one, closing, for example, a cargo doorway to the cabin, it is particularly necessary to insure that such a door can not be opened at all while in flight, either by accident or by malicious intent, nor can be opened even purposely until such time as the cabin pressure is substantially equalized with the ambient pressure.

It may be pointed out that it may be necessary to open such a door in flight for parachute delivery of supplies or for parachute jumps of passengers. Even so, if such a door admits to a pressurized cabin, it would be disastrous to permit such a door to open, even intentionally, until the cabin pressure is equalized with the ambient pressure.

According to the present invention, means are provided to insure against accidental or premature release of such door locks under all conditions, by requiring at least one, and preferably multiple independent preliminary releases of other locking or retaining means before the main locking member for the door itself can be moved to released or "open" position. Moreover, by the employment of ports of fair area yet smaller than the door, and port covers for the same which must be opened in opposition to cabin pressure as part of the preliminary release, it is assured that the cabin pressure will be equalized with the ambient pressure, due to the preliminary opening of such ports, prior to any possible opening of the main door.

By providing several such ports and port covers and by requiring their successive individual and preliminary opening before the main door lock can be released, there is insured gradual release of the lock means for the outwardly opening door by reason of the staged release of individual ports.

By providing that the port covers are movable toward open position inwardly of the cabin, against the cabin pressure tending to push them tightly closed, and by making these port covers of such area that their release in opposition to the cabin pressure is difficult or, under some conditions of pressure difference, impossible, the present invention insures against the opening of the door at all, whether it opens outwardly or inwardly, whether such attempt to open is accidental, malicious or intentional, until the cabin pressure, through the cabin pressure control means or otherwise, is made substantially equal to the ambient pressure. In this way explosive outdrafts are prevented, and no port can be opened, much less the main door, until the internal and ambient pressures are about equal.

According to the present invention, in the preferred form, all mechanism to the above ends with the exception of a fixed element for engagement by a lock on the door, are mounted upon the door, which thus can be manufactured and handled and installed as a unit subassembly.

With the above objects in mind, and others as will appear more fully hereinafter, the present invention comprises the novel combination in an aircraft of the door closing a doorway into a pressurized cabin space, with at least one and preferably several smaller sized ports, yet ports of appreciable area, and their corresponding port covers, whether mounted on the door or within a part of the cabin structure separate from the door, together with a main locking means for the door and subsidiary locks or retaining means associated with each port cover in such a way that they will prevent movement of the main lock to released position until such time as the port cover has been moved to its open position, and, where there are several such ports and port covers, until all such ports and port covers have been moved to their open position. Only then is it possible to operate the main lock for the door to move it into the unlocked position such that the door can be opened.

The invention is disclosed in the accompanying drawings in a typical installation.

Figure 1 is a transverse sectional view through the structure defining the cabin and illustrating the door admitting thereto from the exterior.

Figure 2 is an inside elevational view of the door.

Figure 3 is an isometric view on an enlarged scale, showing the main lock for the door and one of the port covers in its relationship to this main lock, and with all parts in the secured, or locked, position.

Figure 4 is a transverse sectional view of the mechanism shown in Figure 3.

Figure 5 is a transverse sectional view on a still further enlarged scale, illustrating a detail of the operation of the main lock, and Figure 6 is a similar view showing the same parts in the unlocked position.

Figure 7 is a transverse sectional view illustrating the port cover and its relationship to the main lock, with parts shown in full lines in the locked position, and in dot-dash lines in the preliminary releasing position for the port cover, and Figure 8 is a similar view showing the main lock in full lines in unlocked position.

The aircraft structure, indicated generally at 9, defines an enclosed cabin space 90 to which a doorway 91 admits from the exterior. A door 1 closes the doorway, and in this particular embodiment is shown as hingedly connected at 10 along its upper edge to the upper edge of the doorway. It is mounted in such a way that it may swing outwardly to open and inwardly to close, its movement being effected by an actuator 11 or equivalent means, and when closed a seal 12 about the edges of the door prevents escape of pressure from within the cabin space. The door is held thus closed by a hook or similar locking means 2, rotatively supported upon the door (and preferably there are several such hooks at intervals distributed along the swinging edge of the door) which is engageable with a stationary lock pin 92 fixed to the structure 9 in position for engagement by the hook or hooks 2. This hook or these hooks are mounted upon shafts 20 journaled upon the door 1 and are suitably connected to a release handle 22 upon a shaft 21, at an elevated location upon the door, for example, through a lever 23 on the shaft 21, a link 24 and intermeshing gear quadrants at 25, one of which is rotatable by the link 24 and the other of which is carried upon the shaft 20. Spring clips 26a and 26b retain the release handle 22 in locked and in unlocked positions, respectively. It will be understood that each pin 92 is coaxial with the corresponding shaft 20 when parts are secured in the locked position. This is best seen in Figure 3.

Were no more required to open the door 1 than merely to throw the release handle 22 from its secured to its released position, it would be possible to release the door 1 while in flight, with the cabin pressurized, and the cabin pressure would immediately blow the door outwardly into the airstream, and such an outdraft would be created as would be likely to sweep persons and objects outwardly through the doorway 91. Accordingly, it is necessary to provide means to prevent such an occurrence.

One or more ports are provided with corresponding port covers, and as herein shown such port or ports (and preferably there are several) are provided in the door as indicated at 13. These are capable of being closed by the port covers 3 which, in effect, are small doors that preferably are hingedly mounted at or near their lower edge to swing inwardly to open. Preferably, the hinge for the port covers 3 is inset from the door to a point indicated at 30, which point, in the closed or locked position of parts, is inwardly of but in the vicinity of the aligned pins 92 and shafts 20. The hinge at 30 is supported from the door by strong brackets 31. Each port cover is sealed also about its edges, as indicated at 32, so that when the port covers are closed, escape of pressure from within the cabin is prevented. Cabin pressure acting over the area of the port covers 3 presses them tightly to their seats.

Each door carries a securing dog 33 or an equivalent element, positioned to interengage with the hook 2 or with some element that is rotative with the hook 2 and its shaft 20. These parts are so interengaged when the door is closed and locked, and the port cover 3 is closed and secured. This position of parts is shown in Figure 7 in full lines. If, however, the port cover 3 is swung inwardly toward open position, the dog 33 will eventually disengage the hook 2 and becomes a releasing element. When so disengaged, but not before, the hook 2 may be rotated toward its released position. Such inward swinging of the port cover and consequent movement of the dog 33 has been shown in dot-dash lines in Figure 7.

It will be realized that the outward force on the port cover 3 of the higher cabin pressure will tend to prevent strongly the inward movement of the port cover, particularly if the same is of any appreciable area, as it would be in a proper design. Nevertheless, it is desirable to provide further means to insure the retention of the port cover in its closed position under usual flight conditions, yet to enable its movement to open position when the cabin pressure has been reduced to a value approaching or equaling the ambient pressure. A release handle 34 is pivotally mounted at 35 upon the inside of the door, in the vicinity of the upper edge of the port cover, and the lower end of this handle 34 is pivotally connected at 36 to the port cover. A spring 37 acting between the handle 34 and a fixed point upon the door tends to urge the handle, and consequently the port cover, toward the full line position of Figure 7, that is, toward the closed position. This it will do even if, during non-pressurized flight, exterior pressure should exceed interior pressure. Notwithstanding that this release handle 34 is designedly rather short, there is sufficient leverage that it may be pushed inwardly from the full line position of Figure 7 to the dot-dash line position thereof provided the outward pressure force acting upon the door is not appreciably greater than the external pressure, that is, if the internal and external pressures are substantially in equilibrium. Under those conditions, the release handle 34 may be pushed outwardly to the dot-dash line position of Figure 7, and in so doing, the upper edge of the port cover 3 is pushed inwardly, as is shown by the arrow in Figure 7, thereby opening a port between the cabin interior and the exterior for completion of equalization of pressure, and the locking dog 33 is withdrawn, so that now the main release handle 22 may be moved downwardly to released or unlocked position to rotate the hook 2 into the position of Figure 8, whereupon the door 1 may be swung outwardly by its actuator 11.

It is preferred that there be several such ports and port covers, each with its individual locking dog that must be individually released, and that these several ports and port covers be distributed along the length of the swinging edge of the door. Parts are shown thus in Figure 2. By so doing, the release of the main door may be gradual from one end to the other and no heavy strain is placed on any single locking element, yet the multiplication of the locking dogs 33 and their individual releasing means insures against accidental unlocking of the door.

If it is desired to inidcate the position of each of the several hooks 2, each thereof may be formed with a cam surface 29 located so that it will close a microswitch 99 when the hook is in released position, and leave the switch open when the hook is in locked position. The several micro-switches may be in circuit with indicating means, so that a crew member can determine at a glance if or when any hook is released. Unless all hooks are fully engaged, leakage will occur and it is not possible to pressurize the cabin.

We claim as our invention:

1. In an aircraft, in combination with structure defining an enclosed pressurized cabin space, having a doorway to the exterior, a door mounted upon said structure for movement between a position wherein it closes the doorway and retains the cabin pressure, and an open position, locking means interrengageable between the door and the structure, including a member movable between locking and released positions, a port of small size as compared to the doorway, affording communication between the cabin space and the exterior, a cover mounted for movement relative to said port between closed and open positions, means to retain said cover in closed position, including a releasing element, and means interrengageable between the cover-retaining means and the door-locking means to prevent movement of said movable member to released position, and consequent opening of the door, until the cover-retaining means has been moved to its released position and the cover has been moved to open position, to equalize exterior and cabin pressures through said port.

2. The combination of claim 1, wherein the port's cover is mounted for movement inwardly to the cabin interior for opening against the cabin pressure.

3. The combination of claim 1, wherein the door is hingedly mounted upon the aircraft structure to swing outwardly to open position, and wherein the port's cover is hingedly mounted to swing inwardly into the cabin, and against any cabin pressure, to open.

4. The combination of claim 1, wherein the door is hingedly mounted upon the cabin structure, and the port is formed in the door and the port's cover is hingedly mounted upon the door, and wherein the cover-retaining means, and the member movable for opening of the door, are mounted upon and swingable with the door.

5. The combination of claim 4, including a plurality of ports and port covers distributed over the surface of the door, and each having means interengageable between its cover-retaining means and a door-locking means which is common to all said cover-retaining means, whereby all such covers must be moved to open position before the movable member of the door-locking means may be moved to open position.

6. In an aircraft, in combination with structure defining an enclosed pressurized cabin space, having a doorway to the exterior, a door hingedly mounted upon said structure to swing between a closed and an open position, said door having at least one relatively small port which when open also affords communication between the cabin interior and the exterior, a cover hingedly mounted upon the door for movement between a port-closed and an open position, hooks rotatively mounted along the swinging edge of the door, and complemental hook-engaged means mounted on the aircraft structure in position for engagement by said hooks to secure the door tightly closed, means mounted upon the door and operatively connected to said hooks to rotate them between locked and released positions, means mounted upon the door and operatively connected to said port cover to move the latter between open and closed positions, and a locking element carried by and movable with the port cover, and complemental means operatively connected to said hooks, interengageable when the port cover is closed to lock the hooks in door-secured position, with the door closed, and movable into unlocked position, for rotation of the hooks to released position, by movement of the port cover to its open position.

7. The combination of claim 6, wherein the door is hingedly mounted to swing outwardly to open, and the port cover is hingedly mounted to swing inwardly to open, and including a plurality of ports and port covers distributed along the swinging edge of the door, a shaft journaled along the swinging edge of the door, whereon the several hooks are mounted, the hook-rotating means including a releasing handle mounted upon the door and operatively connected to said shaft to rotate the latter for simultaneous release of all said hooks, and each port cover including an individual hook-locking element and individual means for moving such port cover, for release of its locking element independently of release of other such locking elements.

No references cited.